United States Patent [19]

Naganathan et al.

[11] Patent Number: 5,390,949
[45] Date of Patent: Feb. 21, 1995

[54] ACTIVE SUSPENSION SYSTEMS AND COMPONENTS USING PIEZOELECTRIC SENSING AND ACTUATION DEVICES

[75] Inventors: Ganapathy Naganathan, Maumee; Sridhar R. Thirupathi, Toledo, both of Ohio

[73] Assignee: The University of Toledo, Toledo, Ohio

[21] Appl. No.: 27,469

[22] Filed: Mar. 8, 1993

[51] Int. Cl.⁶ .............................................. B60G 11/00
[52] U.S. Cl. .................................... 280/707; 267/162; 267/228; 280/701; 310/316
[58] Field of Search .............. 280/707, 697, 698, 701, 280/712, 688, 724, 715, 670, 671, 672, 692, 797, 798, 702, 711, 713, 716, 725, 726; 310/316; 267/162, 228

[56] References Cited

U.S. PATENT DOCUMENTS

| | | | |
|---|---|---|---|
| 2,263,107 | 11/1941 | Smirl | 267/228 |
| 2,420,462 | 5/1947 | Carr | 280/701 |
| 4,175,242 | 11/1979 | Kleinschmidt | 310/316 |
| 4,349,183 | 9/1982 | Wirt et al. | |
| 4,849,668 | 7/1989 | Crawley et al. | |
| 4,868,447 | 9/1989 | Lee et al. | 310/316 |
| 4,984,819 | 1/1991 | Kakizaki et al. | 280/707 |
| 5,013,955 | 5/1991 | Hara et al. | |
| 5,105,918 | 4/1992 | Hagiwara et al. | 280/707 |

FOREIGN PATENT DOCUMENTS

| | | | |
|---|---|---|---|
| 388352 | 8/1908 | France | 280/701 |
| 571028 | 8/1945 | United Kingdom | 280/702 |

*Primary Examiner*—Eric D. Culbreth
*Attorney, Agent, or Firm*—Marshall & Melhorn

[57] ABSTRACT

A lightweight, high performance, active suspension system utilizing piezoelectric regulated springs, and a method of manufacturing the suspension system, is described. Piezoelectric material is bonded to suspension springs, and excited appropriately to vary the stiffness of the suspension system. A method of controlling the stiffness of a spring includes piezoelectric material bonded to the spring, a sensor system for generating a signal proportional to the loading imposed on the spring, and controller for exciting the piezoelectric material in response to the signal. A control system for controlling the stiffness of a spring including embedding a plurality of piezoelectric particles within an electrically conductive matrix forming the body of the spring is also described.

13 Claims, 4 Drawing Sheets

ACTIVE SUSPENSION SYSTEMS AND COMPONENTS USING PIEZOELECTRIC SENSING AND ACTUATION DEVICES

BACKGROUND OF THE INVENTION

1. Field of the Invention.

This invention relates to an active suspension system and the use of piezoelectric materials and controls on conventional suspension systems. More particularly, the invention relates to automotive active suspension systems using piezoelectric elements to change the stiffness and damping characteristics of the suspension systems.

2. Description of the Prior Art.

Two areas of prior art that are relevant to the present invention are piezoelectric materials and automotive suspension systems. These areas of prior art are discussed below.

PIEZOELECTRIC MATERIALS: Materials that generate electric potentials when subjected to mechanical stresses are called piezoelectric materials. When subjected to an electrical field, piezoelectric materials undergo mechanical strains and will change dimensions. Piezoelectric materials that vary dimensions in expansion or contraction upon the application of an electric field have long been used as motive elements. Piezoelectric materials also exhibit polarity effects, in that reversing the polarity of an applied electric field reverses the dimensional changes of the materials.

An example of a piezoelectric device utilizing the properties of dimensional change and polarity effects is U.S. Pat. No. 4,349,183 to Wirt et al., which discloses the use of piezoelectric crystals bonded to a flexure spring assembly in a ring laser gyro dither mechanism. The spring assembly connects a hub to a ring concentric with the hub. Application of a voltage of alternating polarity to the crystals causes the crystals to flex in a first direction, and then to flex in an opposite direction as the polarity of voltage is reversed. The flexing crystals cause the attached spring assembly to flex similarly, and consequently cause the hub to take on an oscillating rotational movement relative to the ring.

U.S. Pat. No. 4,849,668 to Crawley et al. discloses the use of a composite structural member formed of multiple layers of graphite fibers bound within an epoxy matrix. A plurality of piezoelectric sensors detect displacement of the member. The sensors communicate with a controller and the controller generates electrical excitations which are applied to piezoelectric elements embedded within the member to induce displacement of the member.

The dimensional changes of piezoelectric materials can be rapidly and precisely controlled. The response time of piezoelectric materials to any external loading is 10 milliseconds or less. As an actuator, piezoelectric materials offer controllable, precise displacements in the micrometer range. Although the displacement of a flexing piezoelectric crystal is small, piezoelectric materials can exert significant surface forces. Piezoelectric materials produce little heat or noise during operation and so operate with high efficiency.

Piezoelectric materials are both naturally occurring and man-made. Anisotropic materials such as quartz, tourmaline, and rochelle salt are some of the naturally occurring piezoelectric materials. Synthetic piezoelectric materials are termed piezoceramics. Lead Zirconate Titanate (PZT), Lead Magnesium Niobate (PMN), and Poly-vinylidene Fluoride (PVDF) are some commercially available piezoceramics. Since piezoceramic materials can sense mechanical strain conditions and respond quickly to command excitations exerting relatively large forces, their use is being considered for active vibration control of flexible structures.

AUTOMOTIVE SUSPENSION SYSTEMS: Automotive suspension systems can be divided into three different classes:

1. Passive—no means are provided to actively control the suspension system damping or stiffness during operation.
2. Semi-active—the suspension system damping is actively controlled during operation, but the suspension system stiffness is not.
3. Active—both the stiffness and the damping in the suspension system are actively controlled during operation. Active control of the suspension system results in superior ride quality, countering many undesirable aspects of a vehicle's ride, such as acceleration squat, brake dive, vehicle pitching at bumps and pits, and outward roll of the vehicle at corners.

Design considerations such as vibration isolation, space constraints, stability, reliability, and handling requirements of the application dictate the choice of a suspension system for a particular application.

The small deflection capability of piezoelectric materials has previously limited the use of piezoelectric materials in automotive suspension system applications. Typical applications have included control actuators requiring only limited movement, and pressure sensors.

For example, U.S. Pat. No. 5,013,955 to Hara et al. discloses the use of piezoelectric sensors and piezoelectric actuators to effect a semi-active suspension system by varying the damping force of a shock absorber. A piezoelectric sensor generates signals proportional to the force applied to the shock absorber. The sensors feed the signals to an electronic control unit, which generates appropriate high voltage signals for a piezoelectric actuator. The actuator moves through a limited distance to control oil flow in the shock absorber, thereby regulating the damping effect of the shock absorber.

While the semi-active suspension system of Hara et al. uses piezoelectric materials to regulate the damping in the system, the suspension system does not have all the advantages of an active suspension system. Presently, active control of a vehicular suspension system is achieved by replacing conventional springs and shock absorbers with hydraulic actuators. Johnson, *Lotus Sees GM Leading With Active Suspension*, Automotive News, Sep. 11, 1989, at 44. Sensors detect the movements of the suspension system and the load applied to the suspension system. The sensors feed indicative signals to an on-board computer. Other sensors feed the computer information on driving conditions such as speed and steering angle. A hydraulic power unit supplies pressurized oil to a hydraulic control unit. Upon appropriate commands from the on-board computer, the hydraulic control unit directs the pressurized oil to the hydraulic actuators at each of the wheels. The control unit regulates the pressure of the oil supplied to control both the stiffness and the damping of the suspension system.

The primary draw-back in using a hydraulic system for an active suspension system is its excessive weight, which detracts from a vehicle's fuel economy. U.S. Automobile manufacturers are facing challenges to comply with federal guidelines for improved Company Average Fuel Economy (CAFE). Hence, those in the art continue to search for a lightweight active suspension system for automobiles. It should be understood that the term "automobiles" is meant to include all vehicles with suspension systems, including trucks, motorcycles, trailers, motorhomes and other wheeled vehicles.

A more effective and lightweight active suspension system may be realized by using piezoelectric material to directly control both the stiffness and damping of the suspension system. Piezoelectric regulation of an active suspension system enables control of the vehicle in any desired ride mode, while overcoming the weight handicap of the available hydraulic systems. Additionally, it is believed that such a system will be quieter, and have a lower power consumption than hydraulic systems. Finally, the excitation of a piezoelectric suspension system can be changed more rapidly than the pressure applied to a hydraulic actuator can be changed. A piezoelectric regulated system will therefore be able to respond to a greater number of ride disturbances per second than a hydraulic active suspension system.

SUMMARY OF THE INVENTION

According to the present invention, both piezoelectric sensing and actuation are applied in a fully active suspension system to provide controllable stiffness for suspension mechanisms. Light weight and high performance active suspension can be achieved by applying piezoelectric actuation in association with suspension system structural members. Layers or segments of piezoelectric material are bonded to elastic members of certain geometry at strategic locations. The piezoelectric material regulates the stiffness of the elastic members when the piezoelectric material is controllably excited.

A programmable controller regulates the excitation of piezoelectric materials affixed to suspension springs, thereby controlling the stiffness and damping characteristics of a suspension system. A piezoelectric regulated spring is formed when a spring is provided with control elements made of a piezoelectric material. By modulating the voltage applied to the control elements, both the stiffness and damping of a piezoelectric regulated spring are regulated.

In automotive applications, changes in the motion of a vehicle may subject a suspension spring to loads that move the spring through a range of several inches. The motion of the spring is proportional to the load imposed. Sensors detect the instantaneous deflections of the springs and send signals indicative of the imposed load to a programmable controller. The control mechanism calculates appropriate instantaneous electrical excitations and applies the appropriate voltage to the piezoelectric elements. Although deflections of the individual elements affixed to the spring are small, the energized elements exert a force upon a portion of the spring. The forces exerted by the individual elements are cumulative, and the cumulative effect of many elements is substantial.

The stiffness of a spring is calculated by dividing the measure of a force applied to a spring by the resultant deflection of the spring. A stiff spring strongly opposes the applied load and deflects less than a soft spring. If a spring is aided in opposing imposed loadings, the spring will appear stiffer because a greater imposed loading is required to cause the spring to deflect a given distance. Conversely, if an additional force acts on the spring in the same direction as the imposed loading, the spring will deflect a greater distance for the same imposed loading and appear softer.

In a piezoelectric regulated suspension spring of the present invention, the combined forces exerted by the individual elements may be caused to aid or oppose the force exerted by the spring in opposition to a load. The mechanism controlling the excitation of a suspension system composed of piezoelectric regulated springs can therefore control the stiffness of the suspension system. In this fashion, piezoelectric materials can be used in regulating the action of a suspension spring acting through a range of several inches, despite the limited range of motion of individual piezoelectric elements. The piezoelectric regulated spring can be used in automotive suspension system applications plus other suspension systems and actuator systems where controlling the stiffness and damping of a spring is part of the system.

Oscillations in a piezoelectric regulated spring are also damped by controlling the excitation of the piezoelectric elements. The elements are excited to cause the elements to exert a force opposing the instantaneous motion of the spring. As the spring reaches a maximum displacement in one direction, the polarity of the excitation applied is reversed and the elements are caused to exert a force opposing the motion of the spring in the other direction. The forces exerted by the elements damp the oscillations of the spring.

It is an objective of the present invention to produce a lightweight active suspension system using piezoelectric elements to control directly the stiffness and damping of the suspension system.

It is a further object of the present invention to provide an active suspension system capable of rapidly and frequently reacting to changing driving conditions.

It is also an object of the present invention to provide a suspension element that responds to control signals with a high degree of resolution.

It is yet another object of the present invention to provide an active suspension system that has lower power consumption and less noise than currently available suspension systems in a comparable application.

BRIEF DESCRIPTION OF THE DRAWINGS

The above, as well as other advantages of the present invention, will become readily apparent to those skilled in the art from the following detailed description of a preferred embodiment when considered in the light of the accompanying drawings, in which.

DESCRIPTION OF THE PREFERRED EMBODIMENT

The present invention relates to an active suspension system and the use of piezoelectric controls and material on standard suspension system springs and components to control stiffness and damping of the suspension system. The active suspension system has numerous applications for both automotive and non-automotive matters.

Figure 1:
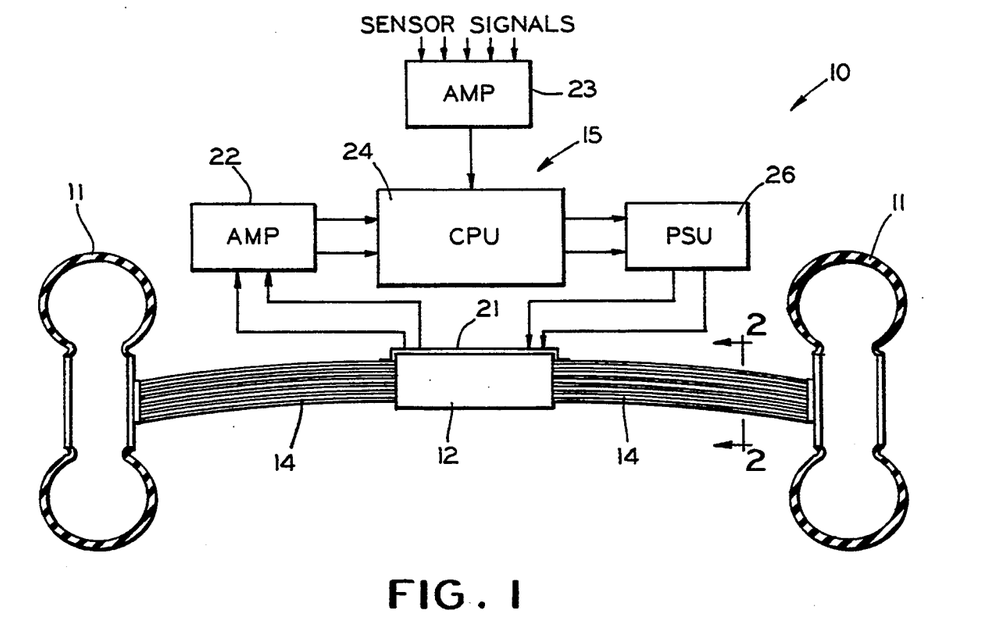
FIG. 1 is a schematic view of a suspension system of the present invention employing a piezoelectric regulated transverse leaf spring.
Figure 2:
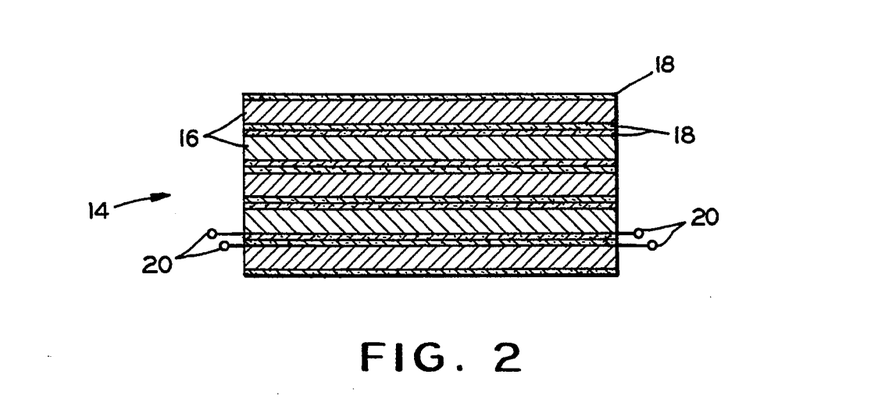
FIG. 2 is an enlarged sectional view of the transverse leaf spring taken substantially along line 2—2 of FIG. 1.

Referring now to the drawings, the first embodiment of the active suspension system 10 of the present invention includes transverse leaf springs 14 coated with piezoceramic layers, as provided in FIGS. 1–2. FIG. 1 shows in schematic form an active suspension system for a vehicle including ground engaging wheels 11 supporting a chassis 12 through a transverse leaf spring 14 incorporating the piezoelectric control system 15 of the present invention.

As shown in FIG. 2, the springs 14 include a plurality of piezoelectric regulated spring leaves, each of which includes a main body portion 16 interposed between two layers of piezoelectric elements 18. The body portion 16 is a monolithic flat strip, formed from a suitable material such as a spring steel. The elements 18 are integrally affixed to opposed surfaces of the body portion 16.

Each piezoelectric element 18 is provided with a pair of electrical leads 20 for transmitting signals and receiving excitation signals. Body portions 16 are not typically supplied with electrical leads. The elements 18 are often positioned to facilitate the wiring of the two leads to a common cable or bus bar 21. Shielded cables or bus bars 21 are used to prevent distortion or interruption of the signals during operation of the automobile. A bus bar 21 is shown in FIG. 1 and typical electrical leads 20 are shown in FIG. 2. The electrical leads, shielded cable, and bus bars have been omitted from the remaining drawings.

Input signals are transmitted from the piezoelectric elements 18 to an amplifier 22, such signals being caused by the deflection of the body portion 16 of the leaf spring 14 which imposes a strain on the piezoelectric elements 18 (FIG. 2). The amplifier 22 is part of the control system 15, which typically includes a central processing unit or programmable computer 24 and a power supply unit 26. Upon receipt of the signals from the elements 18, the amplifier 22 delivers control signals to the computer 24.

A second signal amplifier 23 typically receives signals from driving condition sensors (not shown) monitoring such parameters as vehicular speed, acceleration, steering angle, road conditions, operator-selected ride-modes and position of the wheels 11 relative to the chassis 12. The signal amplifier 23 conditions the signals from the sensors and amplifies the signals for proper input into the computer 24.

It should be understood that a central processing unit comprised of an appropriate programmable logic controller could be utilized in place of the computer 24, and the term "computer" should be understood to mean the use of a central processing unit or other control means when appropriate. The power supply unit 26 has a variable output based on the control signals received from the computer 24.

The computer 24 compares the amplified signals received from the signal amplifier 22 to a set of previously programmed instructions to determine the desired suspension system stiffness and damping. The computer 24 regulates the output of the power supply 26 which transmits the desired excitation to the springs 14 and achieve the desired instantaneous stiffness and damping. The input signals are received continuously and the excitation to the springs 14 is adjusted almost instantaneously in response to changes in the road conditions. The driver of the vehicle will typically be able to program the computer 24 for the type of ride desired by the driver.

Referring again to FIG. 2, the control system 15 excites the piezoelectric element 18 of the spring 14 by imposing a voltage difference between the electrical leads 20 connected to one end of the elements 18 and the electrical leads 20 connected to the other end of the elements 18. The excited elements 18 exert force upon the body portion 16, aiding the body portion 16 in resisting the imposed loading. The stiffness of the spring 14 is thereby effectively modified. The change in stiffness experienced by the spring 14 depends on the magnitude and direction of the force exerted by the elements 18. The magnitude and direction of the force exerted by the elements 18 is, in turn, dependent upon the magnitude and polarity, respectively, of the voltage applied to the elements 18 and the internal polarity of the elements 18.

The piezoelectric active suspension system 10 provides a stable and smooth ride for a vehicle, even at moderate speeds on uneven surfaces and during sharp turns and rapid braking. For instance, if a sharp right turn is suddenly encountered at a high speed and the driver of the vehicle has selected a control option for a level ride on turns, the computer 24 will excite the elements 18 on the left side of the vehicle to cause the suspension system on the left side of the vehicle to behave stiffer than normal. The stiffened suspension system limits the roll of the vehicle as the vehicle proceeds through the turn.

In the event that the power supply 26 is interrupted or failed, the spring 14 will not be excited. The spring 14 will be suitably manufactured to have a stiffness approximating that used in a conventional luxury sedan when in an unexcited state. This retention of a minimal amount of stiffness in the absence of excitation is a safety feature that is similarly applicable to the various configurations described hereinafter.

It will be appreciated that various types of springs may be formed with piezoelectric elements to provide piezoelectric regulation of the instantaneous stiffness and damping of a suspension system. It is expected that many would be suitable for use as the sole spring supporting the chassis 12 upon each wheel 11. Additionally, the general principles of operation of the piezoelectric regulated active suspension system that has been described may be applied to a wide variety of suspension system configurations, such as the suspension systems which will be hereinafter described.

Figure 3:
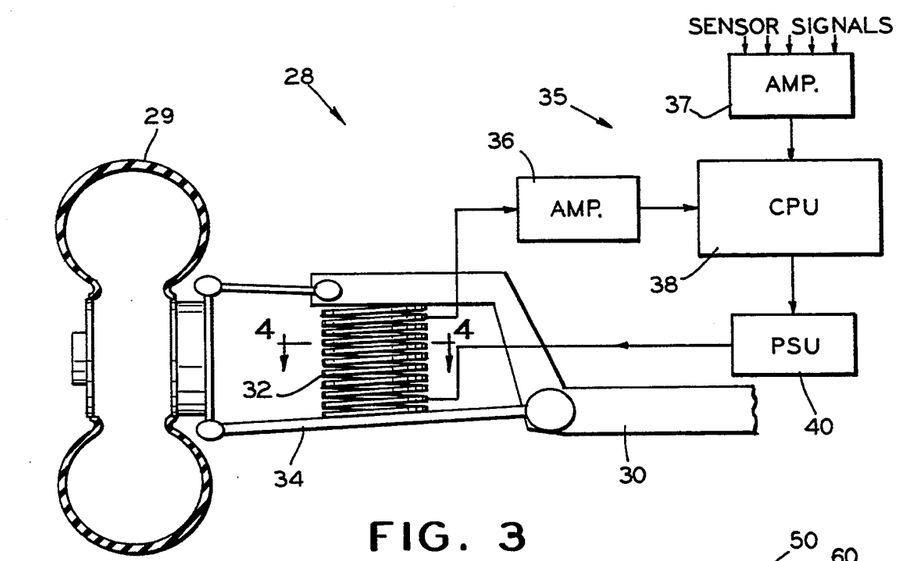
FIG. 3 is a schematic view of a suspension system employing a piezoelectric regulated flat coil spring.
Figure 4:
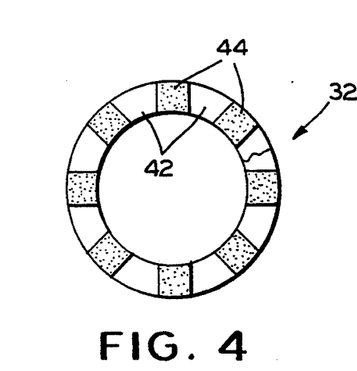
FIG. 4 is an enlarged sectional view of the spring taken substantially along line 4—4 of FIG. 3.

FIGS. 3-4 illustrate a parallel-arm type independent suspension system 28 that includes a ground engaging wheel 29, supporting a chassis 30 through a piezoelectric regulated flat-plate coil spring 32. An arm 34 pivotally interconnects the wheel 29 and the chassis 30. The spring 32 is positioned between the chassis 30 and the arm 34, The arm 34 compresses the spring 32 when the wheel 29 moves upwardly relative to the chassis 30.

A programmable control system 35, similar to the control system 15 in FIG. 1, regulates the stiffness and damping of the suspension system 28. The control system 35 consists of a signal amplifier 36, a sensor amplifier 37, a programmable computer 38 and a power supply 40. Various driving conditions are sensed and control signals are transmitted through the sensor amplifier 37 to the computer 38. The control system 35 regulates excitation of the spring 32 based upon the sensed driving conditions and a set of pre-programmed instructions.

Referring now to FIG. 4, the main body 42 of the flat plate coil spring 32 is formed from a flat strip of spring material wound in a helix. Piezoelectric elements 44 are integrally affixed at spaced locations along the length of the spring body 42.

The control system 35 excites the elements 44 to cause the elements 44 to exert force upon the portions of the spring body 42 to which the elements 44 are affixed. By regulating the force exerted by the elements 44, the control system 35 can vary the stiffness and damping of the portions of the spring 32 to which the various elements 44 are affixed and, consequently, the overall stiffness and damping of the spring 32.

Figure 5:
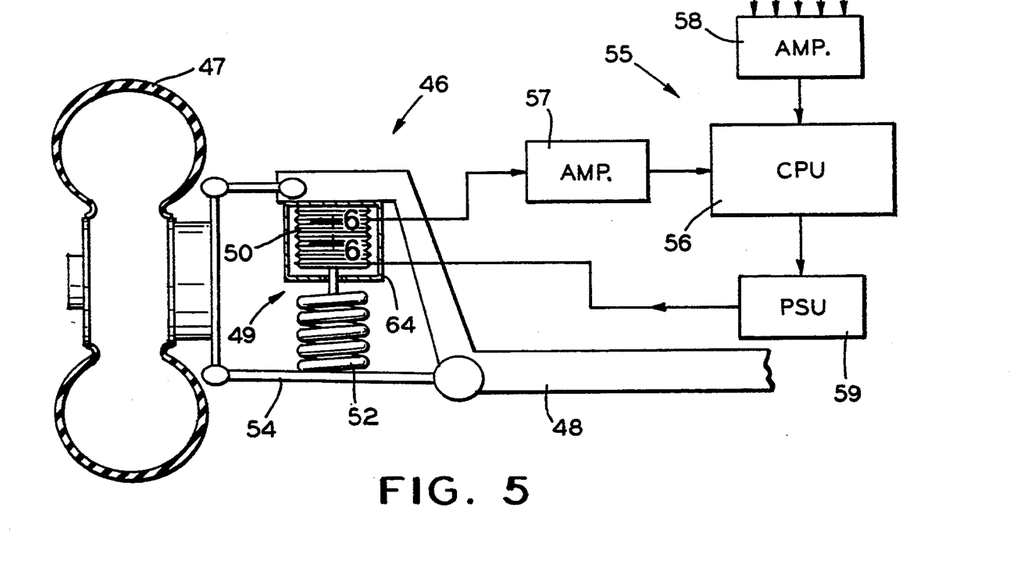
FIG. 5 is a schematic view of a suspension system employing a piezoelectric regulated bellows spring in series with a conventional coil spring.
Figure 6:
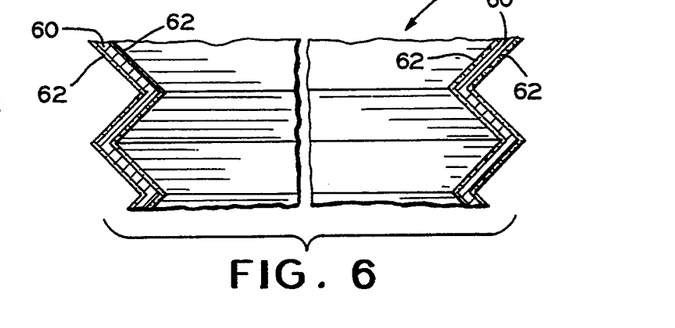
FIG. 6 is an enlarged sectional view of the bellows spring taken substantially along line 6—6 of FIG. 5.

Another active suspension system 46 is shown in FIGS. 5-6. The suspension system 46 is provided with a series spring 49 which includes a piezoelectric regulated bellows spring 50 and a conventional coil spring 52. A ground engaging wheel 47 supports a chassis 48 through the piezoelectric regulated bellows spring 50 and the coil spring 52.

In the parallel arm type independent suspension system, the springs 50 and 52 are interposed between the chassis 48 and an arm 54. The springs 50 and 52 act in series, and are compressed when the wheel 47 moves upwardly relative to the chassis 48.

A programmable control system 55 similar to the control systems hereinbefore described is provided for regulating the excitation of the spring 50. The control system 55 regulates the excitation based upon various sensed driving conditions, including the load imposed upon the spring 50. The control system 55 typically includes a computer 56, an amplifier 57, a second amplifier 58 for the sensor signals, and a power supply 59.

In an unexcited state, the piezoelectric regulated spring 50 is not as stiff as the conventional spring 52. The spring 50 will therefore be the predominantly active member in the suspension system 46, resulting in a soft suspension system. However, when the control system 55 excites the spring 50, the spring 50 expands and is locked under the cover 64, which causes the conventional coil spring 52 to become the predominantly active member in the suspension system 46 and results in a stiffer suspension system.

The spring 50 is a bellows-type spring. As shown in FIG. 6, the spring 50 has a body portion 60 formed of a spring material, such as steel. Piezoelectric elements 62 are integrally affixed to the inner and outer surfaces of the body portion 60. Application of varying amounts of electrical excitation to the elements 62 and the body portion 60 will cause the spring 50 to assume varying stiffness characteristics. The cover 64 encloses the spring 50 and locks the spring 50 in place while spring 50 is excited for expansion. In addition, the cover 64 protects against external damage.

Figure 7:
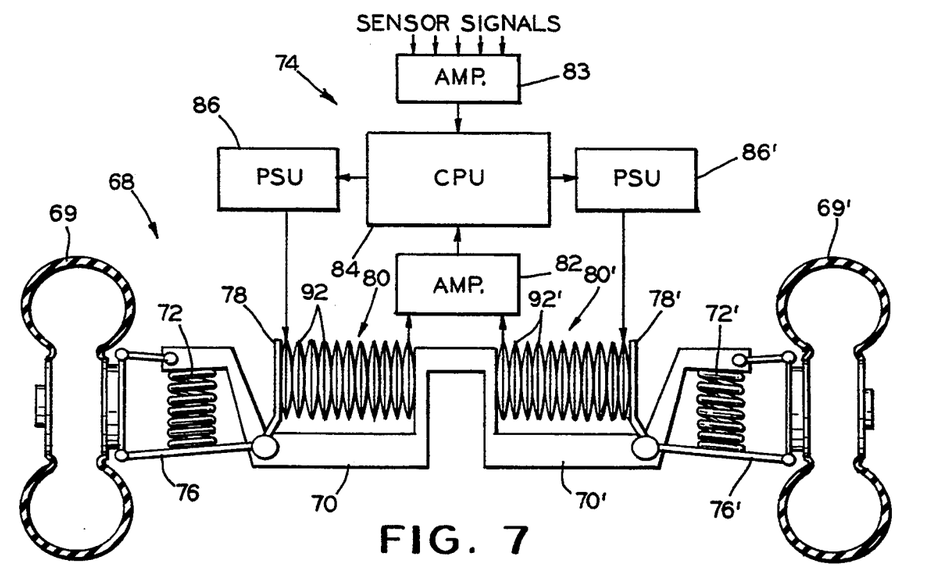
FIG. 7 is a schematic view of a suspension system employing piezoelectric regulated belleville springs acting in parallel with conventional coil springs.
Figures 8, 9, 10:
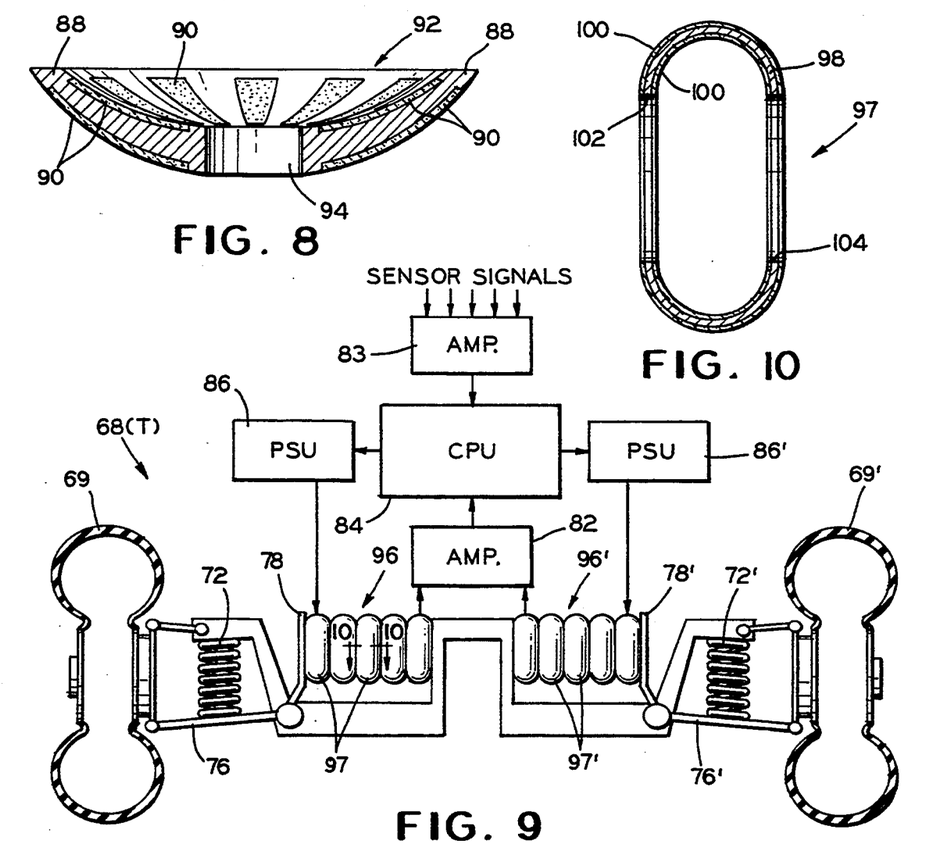
FIG. 8 is an enlarged sectional perspective view of an element of the Belleville springs of FIG. 7.
FIG. 9 is a schematic view of a suspension system similar to that of FIG. 7, employing piezoelectric regulated toroidal springs.
FIG. 10 is an enlarged sectional view of an element of the toroidal springs of FIG. 9.

FIGS. 7-8 illustrate a piezoelectric regulated automotive suspension system 68 in which an auxiliary spring 80 regulated by piezoceramics operates in parallel with a conventional coil spring 72. The ground engaging wheels 69 support a chassis 70 through conventional coil springs 72. The suspension system 68 has a left and a right side, and is bilaterally symmetric about an imaginary centerline. Each side is similar in structure and operation, and similar components on the right side are indicated by prime numbers.

The suspension system 68 is a parallel arm type independent suspension system. A bell crank arm 76 interconnects the wheel 69 and the chassis 70. The spring 72 is interposed between the chassis 70 and the bell crank arm 76. The arm 76 compresses the spring 72 when the wheel 69 moves upwardly relative to the chassis 70.

A retainer arm 78 is fixed to and moves with the bell crank 76. A piezoelectric regulated spring 80 is interposed between the retainer arm 78 and the chassis 70. When the arm 76 moves to compress the main spring 72, the piezoelectric regulated spring 80 is compressed between the retainer arm 78 and the chassis 70.

A similar control system 74 is provided for controlling the excitation of the spring 80. The control system 74 includes a signal amplifier 82, a sensor signal amplifier 83 a programmable computer 84, and a power supply 86. Various sensors supply the control system 74 with signals about driving conditions, including a signal indicative of the force applied of the spring 80. The sensor amplifier 83 conditions and amplifies the signals from the various sensors.

If the output from the power supply 86 is discontinued, the suspension system 68 is soft, like that of a conventional luxury sedan. The auxiliary spring 80 acts in parallel with the main spring 72. The stiffness of the suspension system is dependent upon the combined stiffness of the springs 72 and 80. Exciting the auxiliary spring 80 causes it to act stiffer, and results in a stiffer suspension system 68.

It is expected that various types of piezoelectric regulated springs may suitably be utilized as the spring 80. As illustrated in FIG. 7, the spring 80 may be formed of a stacked array of Belleville spring elements 92. FIG. 8 shows a perspective sectional view of a suitable piezoelectric regulated Belleville spring element 92. The spring element 92 includes a cup shaped body portion 88 and a plurality of piezoelectric segments 90 integrally affixed in recesses or bonded on both surfaces of the body portion 88. The body portion 88 is a monolithic member formed of a suitable material, such as a spring steel. An aperture 94, formed in the center of the body portion 88, provides means for mounting the element upon a shaft (not shown) in a stacked array with other identical spring elements to form the spring 80 (FIG. 7).

Various other types of piezoelectric regulated springs may be used in place of the Belleville spring 80. For example, FIG. 9 illustrates the identical suspension system 68 to that of FIG. 7, except that a piezoelectric regulated toroidal spring 96 is substituted for the Belleville spring 80.

A plurality of toroid-like elements 97 in a stacked array on a mounting shaft (not shown) form the toroidal spring 96. One element 97 of the composite toroidal spring 96 is illustrated in schematic form in FIG. 10. The spring element 97 is hollow, and the body 98 of the spring element is formed of suitable spring material, such as steel. Piezoelectric elements 100 are integrally affixed to the inner and outer surfaces of the body 98. Opposing apertures 102, 104 are formed in the body 98 to receive the mounting shaft (not shown).

Excitation of the piezoelectric elements 100 causes the toroidal spring element to act stiffer or softer, according to the polarity of the excitation. The spring 96 acts in parallel with the main spring 72. By regulating the excitation of the spring 96, the control system 74 regulates the stiffness and damping of the suspension system 68T.

Figure 11:
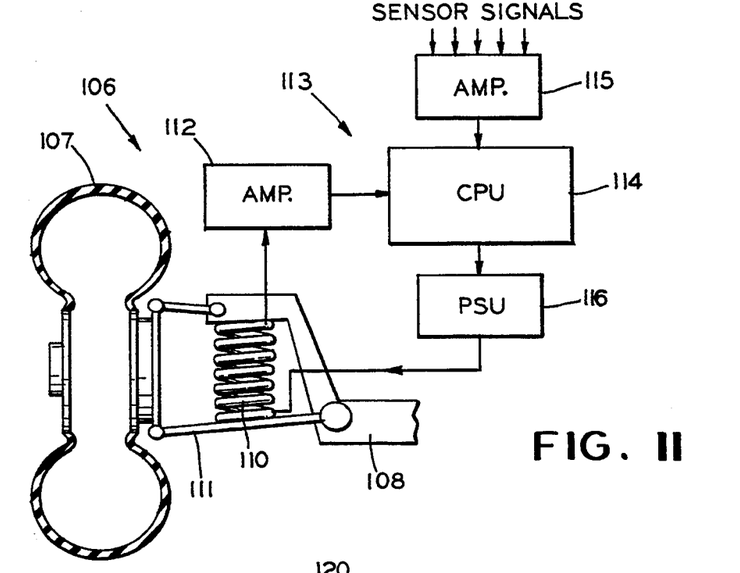
FIG. 11 is a schematic view of a suspension system similar to that of FIG. 3, employing a piezoelectric regulated coil spring.
Figure 12:
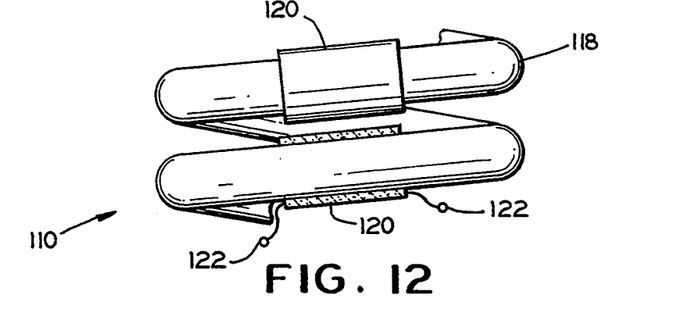
FIG. 12 is an enlarged side elevational view of the coil spring of FIG. 11, including a piezoelectric regulating collar.

An additional suspension system configuration is shown in FIGS. 11-12 in which the stiffness of the coil spring 110 in suspension system 106 is actively controlled using a plurality of piezoceramic rings 120. The suspension system 106 includes a ground engaging wheel 107 supporting a chassis 108 through a piezoelectric regulated coil spring 110. An arm 111 interconnects the wheel 107 and the chassis 108. The arm 111 compresses the spring 110 between the arm 111 and the chassis 108 when the wheel 107 moves upwardly relative to the chassis 108.

A similar control system 113 includes a signal amplifier 112, a programmable computer 114, a sensor signal amplifier 115, and a power supply 116. The control system 113 functions similarly to the control systems hereinbefore described. Sensors send the control system 113 signals indicative of driving conditions, including indication of the deflection of the spring 110. The control system 113 regulates the excitation of the spring 110 based upon programmed instructions and the signals received.

As illustrated in FIG. 12, the main body portion 118 of the spring 110 is formed from round strip stock of a suitable spring material, such as a spring steel. The spring 110 differs from the spring 32 illustrated in FIGS. 3 and 4 principally in the manner that piezoelectric regulation of the spring 110 is effected. Instead of the piezoelectric segments 44 illustrated in FIG. 4, the spring 110 is provided with a plurality of piezoelectric collars 120 formed about and integrally affixed to coils 118 of the spring 110. Electrical leads 122 are provided at the axial ends of the collar 120. The polarity of the collar 120 is differentiated in the axial direction. Application of an electric voltage across the electrical leads 122 produces an electric field in the circumferential direction. According to the theory of piezoelectricity, this electric field produces a shearing action in the circumferential planes of the collar 120.

Compression of the spring 110 between the arm 111 and the chassis 108 results in the creation of torsional stress in the coils of the spring 110. The shearing action produced by the electric field will be felt as an additionally induced torsional stress in the coils of spring 110. By controlling the excitation of the elements 120, the control system 113 governs the induced torsional stress in the spring 110. By governing the interaction of the induced torsional stress with the torsional stress created by the vehicle load compressing the spring 110, the control system 113 regulates the stiffness and damping of the spring 110.

Figure 13:
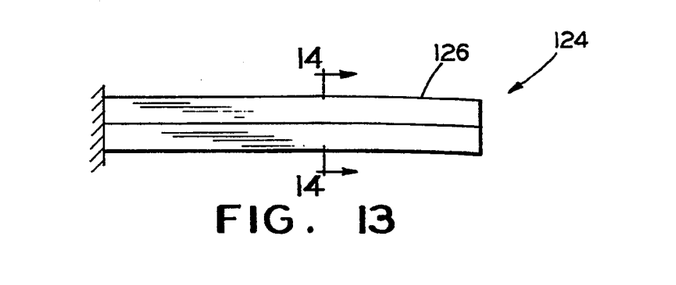
FIG. 13 is a schematic view of a leaf spring formed of a piezoelectric particulate composite material.
Figure 14:
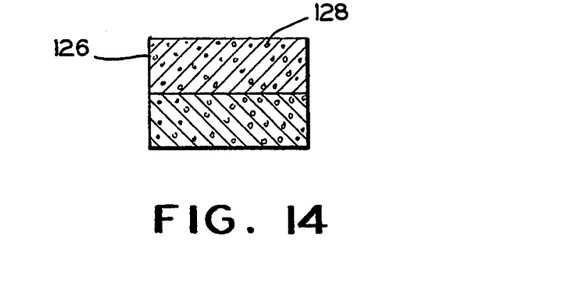
FIG. 14 is an enlarged section view of the spring taken substantially along line 14–14 of FIG. 13.

The form of piezoelectric regulated springs described above have been characterized by piezoelectric elements affixed to the outer surface of a spring body portion. FIGS. 13 and 14 schematically illustrate a leaf spring 124 made of piezoceramic particulate composite. The leaf spring includes two leaf elements having a body portion 126 of suitable spring material, such as steel.

The body portion 126 of each leaf element forms an electrically conductive matrix into which piezoelectric particles 128 are dispersed. The particles 128 are disposed with generally aligned polarity. A voltage is applied across each body portion 126. By applying a voltage across a body portions 126, the control system generates an electric flux that will flow through the matrix of the portion 126 as well as the piezoelectric particles 128. The dielectric properties of the matrix and the particles 128 may be regulated during manufacture such that during operation, electrical flux lines will tend to pass through the particles in preference to the matrix of the portion 126.

The particles 128 will consequently be under the influence of strong electric fields and hence will undergo deformations that induce stresses in the spring 124. With the polarity of the particles aligned, the effects of the induced stresses will be cumulative. Excitation of the piezoelectric particles 128 may be regulated by a programmable control system of the type hereinbefore described to realize varying stiffness and damping properties of the spring 124.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while the spring 124 is described as a leaf spring, it is anticipated that springs of various types may be similarly manufactured with piezoelectric particles dispersed in an electrically conductive matrix. Similarly, those in the art will recognize that various types of springs may be provided with piezoelectric elements integrally affixed to-the surface of the spring body to provide piezoelectric regulation in the manner hereinbefore described. Piezoelectric regulated springs may further be used in various kinds of vehicle suspension systems, other than the types of suspension systems described herein.

What is claimed is:

1. A system for controlling the stiffness and damping of a vehicle suspension spring comprising:
    a) a plurality of piezoelectric elements integrally affixed to the vehicle suspension spring, said piezoelectric elements including means for transmitting an input signal in response to a mechanical stress applied to the spring, and including means for receiving an excitation signal to effect a variable force on the spring;
    b) sensor means for generating a plurality of control signals representative of selected driving conditions;
    c) amplifier means, including a first amplifier electrically connected to said piezoelectric elements for receiving and amplifying the input signal from said piezoelectric elements, and a second amplifier for receiving and amplifying the control signals representative of selected driving conditions from said sensor means; and d) control means connected to the first amplifier for receiving and analyzing the input signal, and connected to the second amplifier for receiving and analyzing the control signals, said control means transmitting, in response to the selected driving conditions, a modulated excitation signal to said piezoelectric elements, the modulated excitation signal from said control means varying the force exerted by said piezoelectric elements on the spring in response to an instantaneous motion of the spring caused by the mechanical stress, which controls the damping of the spring, and simultaneously varying the force exerted by said piezoelectric elements on the spring in response to the control signals from said sensor means, which controls the stiffness of the spring.

2. A system for controlling the stiffness and damping of a vehicle suspension spring comprising:

a) a spring steel body forming an electrically conductive metal matrix;

b) a plurality of piezoelectric particles embedded within said matrix, said piezoelectric particles in said metal matrix including means for transmitting an input signal in response to a mechanical stress applied to said spring body, and including means for receiving an excitation signal to effect a variable force on said spring body;

c) sensor means for generating a plurality of control signals representative of certain driving conditions;

d) amplifier means, including a first amplifier electrically connected to said piezoelectric particles for receiving and amplifying the input signal from said piezoelectric particles, and a second amplifier for receiving and amplifying the control signals representative of selected driving conditions from said sensor means; and e) control means connected to the first amplifier for receiving and analyzing the input signal, and connected to the second amplifier for receiving and analyzing the control signals said control means transmitting, in response to the selected driving conditions, a modulated excitation signal to said piezoelectric particles, the modulated excitation signal from said control means varying the force exerted by said piezoelectric particles on said spring body in response to an instantaneous motion of said spring body caused by the mechanical stress, which controls the damping of said spring body, and simultaneously varying the force exerted by said piezoelectric particles on said spring body in response to the control signals from said sensor means, which controls the stiffness of said spring body.

3. The system defined in claim 2 wherein said plurality of piezoelectric particles are disposed with aligned polarity to provide a cumulative effect in the variable force on said spring body.

4. An active suspension system having stiffness and damping control, said suspension system comprising:

a) a spring for supporting a chassis;

b) a plurality of piezoelectric elements integrally affixed to said spring, said piezoelectric elements including means for sensing a mechanical stress applied to said spring and generating an input signal, and means for receiving an excitation signal to effect a variable force on said spring;

c) sensor means mounted on the chassis for sensing a plurality of operational conditions and generating a plurality of control signals representative of selected operational conditions;

d) amplifier means, including a first amplifier electrically connected to said piezoelectric elements for receiving and amplifying the input signal from said piezoelectric elements, and a second amplifier for receiving and amplifying the control signals representative of selected operational conditions from said sensor means;

e) controller means electrically connected to the second amplifier for receiving and analyzing the control signals, and electrically connected to the first amplifier for receiving and analyzing the input signal from said piezoelectric elements, said controller means comparing the control signals and the input signal with a set of preprogrammed instructions, and for generating a feedback control signal; and f) power supply means for receiving the feedback control signal from said controller means and transmitting, in response to the selected operational conditions, an excitation signal to said piezoelectric elements, the excitation signal from said power supply means varying the force exerted by said piezoelectric elements on said spring in response to an instantaneous motion of said spring caused by the mechanical stress, which controls the damping of said spring, and simultaneously varying the force exerted by said piezoelectric elements on said spring in response to the control signals from said sensor means, which controls the stiffness of said spring.

5. The active suspension system defined in claim 4 wherein said spring is a leaf spring for a vehicle.

6. The active suspension system defined in claim 4 wherein the chassis is provided with a first arm pivotably interconnecting the chassis to a wheel, and said spring includes a coil spring interposed between the chassis and the first arm.

7. The active suspension system defined in claim 6 wherein said coil spring is a flat plate coil spring with said piezoelectric elements bonded to a surface of said flat plate coil spring.

8. The active suspension system defined in claim 6 wherein said coil spring is a round strip stock coil spring and is provided with a plurality of piezoceramic rings mounted on said coil spring whereby torsional stress in the spring coil is increased.

9. The active suspension system defined in claim 4 wherein the chassis is provided with a first arm pivotably connecting the chassis to a wheel, and said spring includes a bellows spring coated with a piezoelectrical layer and a coil spring connected in series and interposed between said chassis and the first arm.

10. The active suspension system defined in claim 9 wherein the bellows spring includes an elastic membrane coated with piezoelectric layers and enclosed in a hard shell.

11. The active suspension system defined in claim 4 wherein the chassis is provided with a first arm pivotably interconnecting the chassis to a wheel and a second arm affixed to the chassis and the first arm, said first arm and said second extending from the chassis in orthogonal relationship wherein said spring includes a first spring interposed between the chassis and the first arm, and a second spring interposed between the chassis and the second arm, said plurality of piezoelectric elements integrally affixed to said second spring.

12. The active suspension system defined in claim 11 wherein said second spring is a composite belleville spring having piezoceramics embedded in a curved plate of said belleville spring.

13. The active suspension system defined in claim 11 wherein said second spring is a composite toroidal spring having piezoceramic material embedded in a toroidal shell of the spring.

* * * * *